(12) United States Patent
Phillips et al.

(10) Patent No.: US 11,734,685 B2
(45) Date of Patent: *Aug. 22, 2023

(54) REAL-TIME PROCESSING OF REQUESTS RELATED TO FACILITATING USE OF AN ACCOUNT

(71) Applicant: Capital One Services, LLC, McLean, VA (US)

(72) Inventors: Jeremy Phillips, Brooklyn, NY (US); Zhe Liu, McLean, VA (US); Wenjie (Jessica) Liu, New York, NY (US)

(73) Assignee: Capital One Services, LLC, McLean, VA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/446,483

(22) Filed: Aug. 31, 2021

(65) Prior Publication Data

US 2021/0390539 A1 Dec. 16, 2021

Related U.S. Application Data

(63) Continuation of application No. 15/888,409, filed on Feb. 5, 2018, now Pat. No. 11,120,444, which is a
(Continued)

(51) Int. Cl.
*G06Q 20/40* (2012.01)
*G06Q 30/0207* (2023.01)

(52) U.S. Cl.
CPC ......... *G06Q 20/40* (2013.01); *G06Q 30/0215* (2013.01)

(58) Field of Classification Search
CPC .......................... G06Q 20/40; G06Q 30/0215
See application file for complete search history.

(56) References Cited

U.S. PATENT DOCUMENTS 7,050,996 B1   5/2006  Blagg et al.
8,527,381 B2   9/2013  Gerstner et al.
(Continued)

FOREIGN PATENT DOCUMENTS

KR      20190048139 A    5/2019
WO      WO-2014144006 A3 *  6/2015  ............. G06Q 40/06

OTHER PUBLICATIONS

Raghavendra Patidarand Lokesh Sharma. Credit Card Fraud Detection Using Neural Network. International Journal of Soft Computing and Engineering (IJSCE) ISSN: 2231-2307, vol. 1, Issue—NCAI2011, Jun. 2011. (Year: 2011).*
(Continued)

*Primary Examiner* — Virpi H Kanervo
(74) *Attorney, Agent, or Firm* — Harrity & Harrity, LLP

(57) ABSTRACT

A device may receive information related to a first plurality of individuals and an individual. Each of the first plurality of individuals may be associated with a respective one or more accounts. The device may receive a request to match the individual and one or more individuals. The device may determine a match of the individual and the one or more individuals based on the information. The device may receive, from a user device associated with the individual, a selection of an account, of the respective one or more accounts, associated with another individual of the first plurality of individuals. The device may provide, for display to the other individual, a notification that the individual and the other individual have been matched and that the individual selected the account associated with the other individual. The device may perform one or more actions related to completing the transaction using the account.

20 Claims, 5 Drawing Sheets

Related U.S. Application Data continuation of application No. 15/888,277, filed on Feb. 5, 2018, now Pat. No. 10,430,790.

(56) References Cited

U.S. PATENT DOCUMENTS

| | | | |
|---|---|---|---|
| 10,387,851 B1 * | 8/2019 | Krajicek | G06Q 20/108 |
| 10,430,790 B2 | 10/2019 | Phillips et al. | |
| 10,909,618 B1 * | 2/2021 | Mortensen | G06Q 40/02 |
| 11,030,619 B2 | 6/2021 | Phillips et al. | |
| 11,120,444 B2 | 9/2021 | Phillips et al. | |
| 2003/0188193 A1 | 10/2003 | Venkataramappa | |
| 2005/0086168 A1 | 4/2005 | Alvarez et al. | |
| 2006/0208064 A1 | 9/2006 | Mendelovich et al. | |
| 2007/0078760 A1 * | 4/2007 | Conaty | G06Q 20/40 |
| | | | 705/44 |
| 2007/0112655 A1 | 5/2007 | Jones | |
| 2007/0214249 A1 | 9/2007 | Ahmed et al. | |
| 2009/0144172 A1 | 6/2009 | Frederick et al. | |
| 2009/0307135 A1 | 12/2009 | Gupta et al. | |
| 2010/0312704 A1 | 12/2010 | Rohatgi | |
| 2011/0302083 A1 | 12/2011 | Bhinder | |
| 2013/0144738 A1 | 6/2013 | Qawami et al. | |
| 2014/0067503 A1 | 3/2014 | Ebarle Grecsek et al. | |
| 2014/0129308 A1 | 5/2014 | Rappoport | |
| 2014/0201531 A1 | 7/2014 | Toy et al. | |
| 2014/0379576 A1 | 12/2014 | Marx et al. | |
| 2015/0178725 A1 | 6/2015 | Poetsch | |
| 2015/0254653 A1 | 9/2015 | Bondesen et al. | |
| 2016/0140546 A1 | 5/2016 | Taratine et al. | |
| 2016/0192123 A1 | 6/2016 | Lim | |
| 2016/0283925 A1 | 9/2016 | Lavu et al. | |
| 2016/0342992 A1 | 11/2016 | Lee | |
| 2017/0083930 A1 | 3/2017 | Nagaraj et al. | |
| 2017/0132719 A1 | 5/2017 | Rogers et al. | |
| 2017/0262841 A1 | 9/2017 | Good et al. | |
| 2017/0323297 A1 | 11/2017 | Shanmugam | |
| 2018/0060844 A1 | 3/2018 | Brennan et al. | |
| 2019/0244202 A1 | 8/2019 | Phillips et al. | |
| 2019/0244203 A1 | 8/2019 | Phillips et al. | |

OTHER PUBLICATIONS

C. Wang, Q. Wang, K. Ren and W. Lou, "Privacy-Preserving Public Auditing for Data Storage Security in Cloud Computing," 2010 Proceedings IEEE INFOCOM, San Diego, CA, USA, 2010, pp. 1-9. (Year: 2010).*

AwardWallet, "AwardWallet Keeps Track of Your Reward Programs," Apr. 12, 2011, 3 pages. Retrieved from Internet:[URL: https://awardwallet.com/en/].

Gorman L., "Comparing Passwords, Tokens, and Biometrics for User Authentication," Proceedings of the IEEE, IEEE, vol. 91 (12), Dec. 2003, pp. 2021-2040.

Jackson, "Sharing Credit Card Accounts," Bankrate, Jun. 23, 2010, 7 pages. Retrieved from Internet:[URL:http://www.bankrate.com/finance/credit-cards/sharing-credit-card-accounts-1.aspx].

Leff, "The Craziest Mileage Earning Schemes and Where you should Focus your Points Earning," May 18, 2011, 16 pages. Retrieved from Internet:[URL:https://viewfromthewing.com/the-craziest-mileage-earning-schemes-and-where-you-should-focus-your-points-earning/].

Leff, The Most Craziest Flyer I Know, May 23, 2003, 10 pages. Retrieved from Internet:[URL:https://viewfromthewing.boardingarea.com/2003/05/23/the-most-creative-flyer-i-know/].

Porche, "Sharing Credit Cards Common, but can bring Problems Joint Accounts Strengthen Bonds, but Encourage Snooping," Nov. 16, 2016, 11 pages. Retrieved from Internet:[URL:https://www.creditcards.com/credit-card-news/shared-credit-card-poll/].

Share.CreditCard, Nov. 3, 2016, 3 pages. Retrieved from Internet:[URL:http://share.creditcard/].

Simon, "Piggybacking is Still an Option, but Proceed with Caution," Feb. 2, 2010, 9 pages. Retrieved from Internet:[URL:https://www.creditcards.com/credit-card-news/simon-credit-card-piggybacking-authorized-user-1508/].

* cited by examiner

REAL-TIME PROCESSING OF REQUESTS RELATED TO FACILITATING USE OF AN ACCOUNT

RELATED APPLICATIONS

This application is a continuation of U.S. patent application Ser. No. 15/888,409, filed Feb. 5, 2018 (now U.S. Pat. No. 11,120,444), which is a continuation of U.S. patent application Ser. No. 15/888,277, filed Feb. 5, 2018 (now U.S. Pat. No. 10,430,790), which is incorporated herein by reference in its entirety.

BACKGROUND

A transaction account may include a checking account, a savings account, a rewards account, a credit account, a demand deposit account, and/or the like. A transaction account may be held by an individual at a financial institution. A transaction account may be accessible to an owner of the transaction account at a request by the owner (e.g., "on demand"). In addition, the transaction account may be available to other individuals, other than the owner of the account, as directed by the owner of the account.

SUMMARY

According to some possible implementations, a system may include one or more memories; and one or more processors, communicatively coupled to the one or more memories, configured to receive, from a plurality of user devices, information related to a first plurality of individuals and a second individual. Each of the first plurality of individuals may be associated with a respective one or more accounts. A first individual, of the first plurality of individuals, may facilitate use, by the second individual, of the respective one or more accounts associated with the first individual in association with completing a transaction. The one or more processors may be configured to receive a request to match the second individual and one or more individuals of the first plurality of individuals. The request may be received from a user device, of the plurality of user devices, associated with the second individual. The one or more processors may be configured to determine a match of the second individual and the one or more individuals of the first plurality of individuals after receiving the request to match the second individual and the one or more individuals of the first plurality of individuals.

The one or more individuals of the first plurality of individuals may include the first individual. The one or more processors may be configured to receive, from the user device, a selection of an account, of the respective one or more accounts, associated with the first individual by the second individual. The one or more processors may be configured to provide, for display to the first individual, a notification that the second individual and the first individual have been matched and that the second individual selected the account associated with the first individual. The notification may be provided to another user device, of the plurality of user devices, associated with the first individual. The one or more processors may be configured to perform one or more actions related to facilitating use by the second individual of the account associated with the first individual to complete the transaction or related to completing the transaction after providing the notification for display.

According to some possible implementations, a non-transitory computer-readable medium may store one or more instructions that, when executed by one or more processors, may cause the one or more processors to receive information related to a first plurality of individuals and an individual. Each of the first plurality of individuals may be associated with a respective one or more accounts that the first plurality of individuals can permit the individual to use to complete a transaction. The one or more instructions, when executed by the one or more processors, may cause the one or more processors to receive a request to match the individual and one or more individuals of the first plurality of individuals. The one or more instructions, when executed by the one or more processors, may cause the one or more processors to determine a match of the individual and the one or more individuals of the first plurality of individuals based on the information related to the first plurality of individuals and the individual.

The one or more instructions, when executed by the one or more processors, may cause the one or more processors to receive, from a user device associated with the individual, a selection of an account, of the respective one or more accounts, associated with another individual of the first plurality of individuals. The one or more instructions, when executed by the one or more processors, may cause the one or more processors to provide, for display to the other individual, a notification that the individual and the other individual have been matched and that the individual selected the account associated with the other individual. The one or more instructions, when executed by the one or more processors, may cause the one or more processors to perform one or more actions related to completing the transaction using the account associated with the other individual.

According to some possible implementations, a method may include receiving, by a computing system, information related to a first plurality of individuals or an individual. Each of the first plurality of individuals may be associated with a respective one or more accounts. The first plurality of individuals may be associated with facilitating the individual to use the respective one or more accounts to complete a transaction. The method may include receiving, by the computing system and from a user device associated with the individual, a request to match the individual and one or more individuals of the first plurality of individuals. The method may include determining, by the computing system, a match of the individual and the one or more individuals of the first plurality of individuals after receiving the request to match the individual and the one or more individuals. The method may include receiving, by the computing system and from the user device, a selection of an account, of the respective one or more accounts, associated with another individual of the one or more individuals. The account may be used by the individual to complete the transaction. The method may include providing, by the computing system and for display, a notification to notify the other individual that the individual and the other individual have been matched and that the individual selected the account associated with the other individual to complete the transaction. The notification may be provided for display via another device associated with the other individual. The method may include performing, by the computing system, one or more actions related to completing the transaction after providing the notification for display.

DETAILED DESCRIPTION

Figure 1:
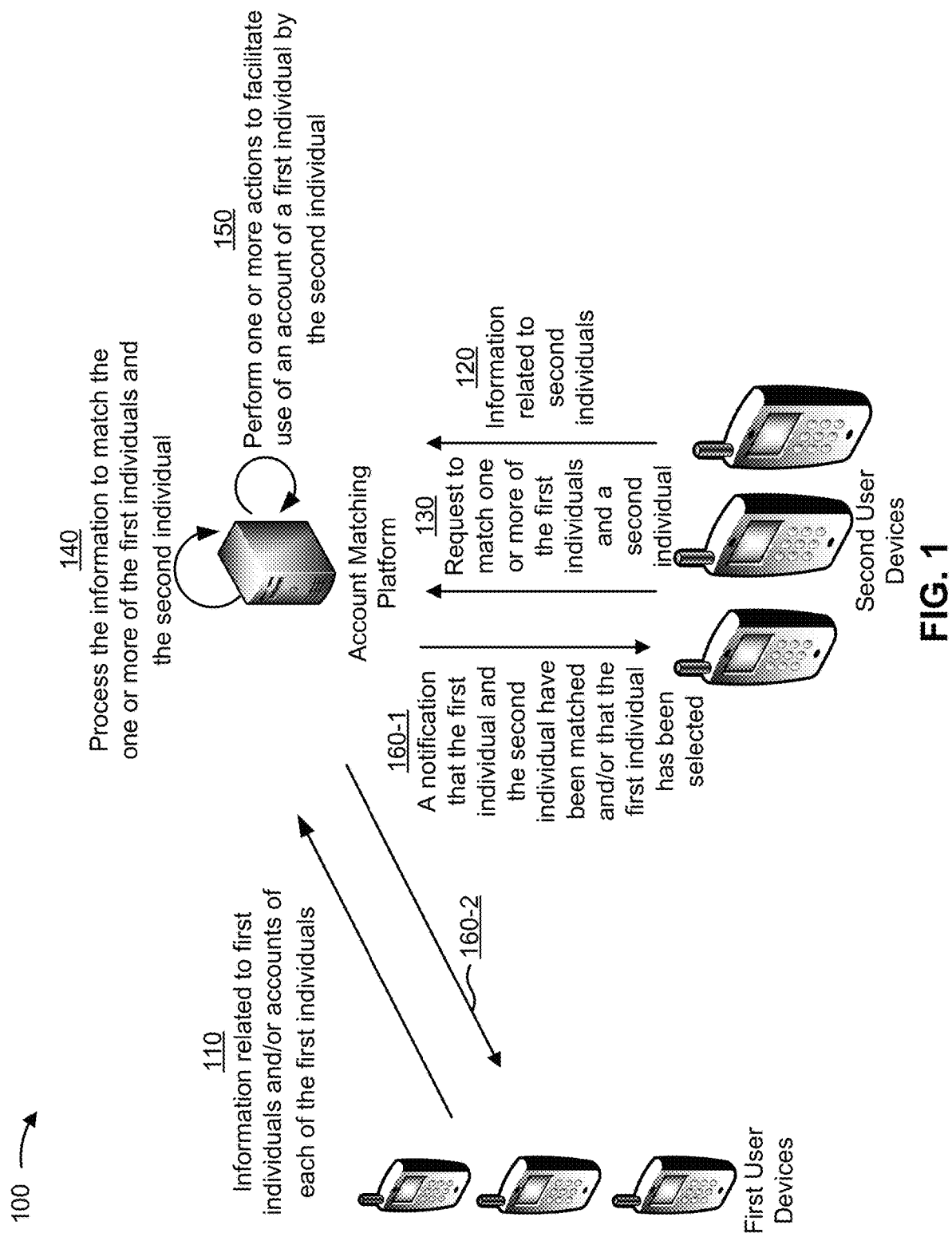
FIG. 1 is a diagram of an overview of an example implementation described herein.

The following detailed description of example implementations refers to the accompanying drawings. The same reference numbers in different drawings may identify the same or similar elements.

An account, such as a transaction account, may be associated with various benefits, such as rewards points, discounts, preferential repayment terms, a line of credit, and/or the like. The benefits associated with an account may only be available to the account owner and/or specific individuals that the account owner has approved (e.g., individuals that the account owner knows and trusts). The process of adding an individual to an account may be time consuming for an account owner, may consume significant computing resources (e.g., via manual use of and/or interaction with one or more computing devices), and/or may be inefficient. Further, individuals, such as individuals that the account owner does not know, may want to use benefits from use of an account that the individuals do not own, so that both the individuals using the account may share in benefits associated with the account (e.g., via increased use of the account for the account owner and via facilitating use of the account by an individual that does not own the account). The current process for approving an individual to be associated with an account does not permit an owner of the account to approve a large quantity of individuals efficiently and/or in a secure manner and is not practicable for doing so on a per transaction basis.

As a specific example, an individual may want to complete a transaction at a particular business, at a particular type of business (e.g., a grocery store, a home goods store, a gas station, etc.), and/or the like. The business and/or a financial institution may offer benefits, such as discounts, cash back, rewards points, and/or the like to owners of particular accounts for completing the transaction. In this case, the individual may not own an account that receives benefits for the transaction, may have reached a limit for an account that receives benefits, may not want to sign up for an account that receives benefits, and/or the like. In addition, owners of accounts that receive benefits may not use all of the benefits (e.g., during a time period, prior to expiration, etc.), may have excess spending capacity that would receive benefits if used, may receive increased benefits from increased use of the accounts, and/or the like. Currently, account owners and individuals wanting to complete transactions using accounts of the account owners may not be capable of identifying each other so that the account owner benefits from increased use of the account and the individual benefits from being able to use the account to complete a transaction.

Some implementations, described herein, provide an account matching platform that is capable of processing data related to multiple accounts and/or requests related to using the multiple accounts. The matching may be performed automatically as part of a transaction, or may be based on user selections prior to completing a transaction. In this way, the account matching platform may match accounts and individuals that want to use the accounts to complete transactions. For example, the account matching platform can match hundreds, thousands, millions, etc. of potential account users with hundreds, thousands, millions of account owners, in a manner not previously possible due to the large amounts of data processed, lack of a capability to process the data objectively (e.g., in a consistent manner), lack of a system configured to perform this type of matching, and/or the like. In addition, this reduces an amount of time needed for an account owner to select individuals to add to an account owned by the account owner to permit the individuals to use the account. Further, this increases a scale at which accounts and other individuals who want to use the accounts can be matched. Further, this provides a marketplace for owners of accounts to offer use of benefits associated with the accounts to other individuals, and in some implementations doing so on a per transaction basis.

FIG. 1 is a diagram of an overview of an example implementation 100 described herein. As shown in FIG. 1, implementation 100 includes multiple first user devices (e.g., associated with owners of accounts), multiple second user devices (e.g., associated with individuals who want to use the accounts), and an account matching platform.

As shown by reference number 110, the first user devices may provide, to the account matching platform, information related to first individuals and/or accounts of each of the first individuals. For example, the first user devices may provide information related to transaction accounts and/or owners of the transaction accounts, such as information that identifies the owners, the transaction accounts, benefits associated with the transaction accounts, preferences of the owners, and/or the like. Continuing with the previous example, accounts that each of the first individuals own may be associated with benefits, such as rewards points, loyalty points, cash back, discounts, and/or the like that may be unused or not received if the first individuals do not use the accounts. The first user devices may provide thousands, millions, billions, or more data elements associated with hundreds, thousands, millions or more accounts and/or owners of the accounts.

As shown by reference number 120, the second user devices may provide, to the account matching platform, information related to second individuals. For example, the second user devices may provide information related to individuals that want to use accounts associated with the first individuals, such as information that identifies the individuals, types of transactions for which the individuals want to use the accounts (e.g., a retail transaction, a fuel transaction, a travel transaction, and/or the like), preferences of the second individuals, and/or the like. Continuing with the previous example, the second individuals may not own particular accounts (e.g., associated with benefits, retailers, etc.) and as a result, may not receive benefits, discounts, and/or the like that would otherwise be received if the second individuals owned the particular accounts and used the particular accounts to complete particular transactions.

As shown by reference number 130, a second user device may provide, to the account matching platform, a request to match one or more of the first individuals and a second individual (e.g., associated with the second user device). For example, a second individual may request, via a second user device, to use an account of a first individual for a transaction. Continuing with the previous example, a second individual may request to use an account via a merchant web site (e.g., where the merchant website is integrated with the account matching platform), a browser plugin for completing a transaction, an application on a user device, and/or the like. The request may include information that identifies a type of transaction for which the second individual wants to use the account of the first individual, information related to an account of the second individual, a set of credentials related to the second individual, and/or the like. In some implementations, the request may be provided as part of an initiated transaction.

Additionally, or alternatively, the request may be provided automatically, when a second individual is completing a transaction (e.g., via a transaction terminal, a website, etc.). For example, the second individual may be pre-enrolled in a service associated with the account matching platform that causes the account matching platform to automatically identify other accounts to use for a transaction associated with the second individual that can provide an increased benefit to the second individual. The account matching platform may receive hundreds, thousands, millions, or more requests (e.g., in a threshold amount of time, simultaneously, etc.), thereby receiving a set of requests that may exceed a quantity of requests that a human actor can process manually.

As shown by reference number 140, the account matching platform may process the information (e.g., related to the first individuals, the second individuals, the requests from the second individuals, and/or the accounts of each of the first individuals) to match the one or more first individuals and the second individual. For example, the account matching platform may match an account of a first individual and a transaction of a second individual based on the type of the transaction and benefits of the account related to the type of transaction (e.g., some accounts may have better benefits for particular types of transactions), based on preferences of the first individuals and/or the second individual, based on whether the second individual requesting use of the account has enough money in an account of the second individual to repay the first individual for use of the account, and/or the like. The account matching platform may optimize an objective (e.g., maximize cash back for the transaction, maximize rewards points received for the transaction, maximize a discount applied to a transaction, minimize processing fees for a transaction, and/or the like).

As shown by reference number 150, the account matching platform may perform one or more actions to facilitate use of an account of a first individual by the second individual (e.g., after receiving a selection of a first individual by a second individual). For example, the account matching platform may perform actions for completing the second individual's requested transaction using the account of the first individual on behalf of the second individual. In some implementations, the account matching platform may provide a set of credentials (e.g., an encrypted set of credentials) to a second user device associated with the second individual to use the account, a security token to be used to complete the transaction using an account of the first individual (e.g., after generating the security token), and/or the like.

The account matching platform may facilitate use of an account by a second individual (e.g., a potential account user) that a first individual (e.g., an account owner) knows (e.g., a trusted individual). Additionally, or alternatively, the account matching platform may facilitate use of an account by a second individual that a first individual does not know (e.g., an untrusted individual). In this way, the account matching platform may maximize benefits to a first individual and/or a second individual (which might not normally be available to the first individual and/or the second individual) while minimizing a likelihood of a negative impact to the first individual, such as a negative impact to the first individual's credit score.

Additionally, or alternatively, and as another example, the account matching platform may store, in a data structure, information related to the second individual to add the second individual to the account of the first individual. Additionally, or alternatively, and as another example, the account matching platform may provide, to a transaction terminal (not shown), information indicating that the second individual may use the account of the first individual to complete a transaction, even though the second individual is not the owner of the account.

For example, the account matching platform may provide a notification to the transaction terminal and/or a transaction backend device (not shown in FIG. 1) to cause the transaction terminal and/or the transaction backend device to request information related to the second individual rather than the first individual when the second individual is using the first individual's account to complete a transaction (e.g., information to verify an identity of the second individual). Additionally, or alternatively, and as another example, the account matching platform may provide a set of instructions to the transaction terminal and/or the transaction backend device to prevent the transaction terminal and/or the transaction backend device from requesting, from the second individual, input of information, such as a personal identification number (PIN), username/password combination, and/or the like associated with the account and/or the first individual. This conserves computing resources of the transaction terminal that would otherwise be erroneously consumed preventing the second individual from using the account of the first individual.

As shown by reference numbers 160-1 and 160-2 the account matching platform may provide a notification that the first individual and the second individual have been matched and/or that the first individual has been selected to facilitate, by the second individual, use of an account for a transaction. For example, the account matching platform may provide the information for display via a user device associated with the first individual and a user device associated with the second individual. The account matching platform may perform matching of hundreds, thousands, millions, or more first individuals and/or second individuals and/or in real-time.

In this way, an account matching platform may automatically, and in real-time, match owners of accounts and other individuals to permit the other individuals to use the accounts to complete transactions. This reduces or eliminates a need for an owner of an account to add another individual to the account to permit the other individual to use the account, thereby conserving time of the owner of the account. In addition, this increases an efficiency of permitting another individual to use an account by reducing or eliminating a need for an owner of the account to manually add the other individual to the account to permit the other individual to use the account. Further, this permits an individual to use an account for a limited purpose (e.g., a particular transaction) without needing to provide the individual with full access to the account.

As indicated above, FIG. 1 is provided merely as an example. Other examples are possible and may differ from what was described with regard to FIG. 1. For example, although FIG. 1 describes matching individuals, the implementations apply equally to matching accounts, offers, and/or the like, as described elsewhere herein.

Figure 2:
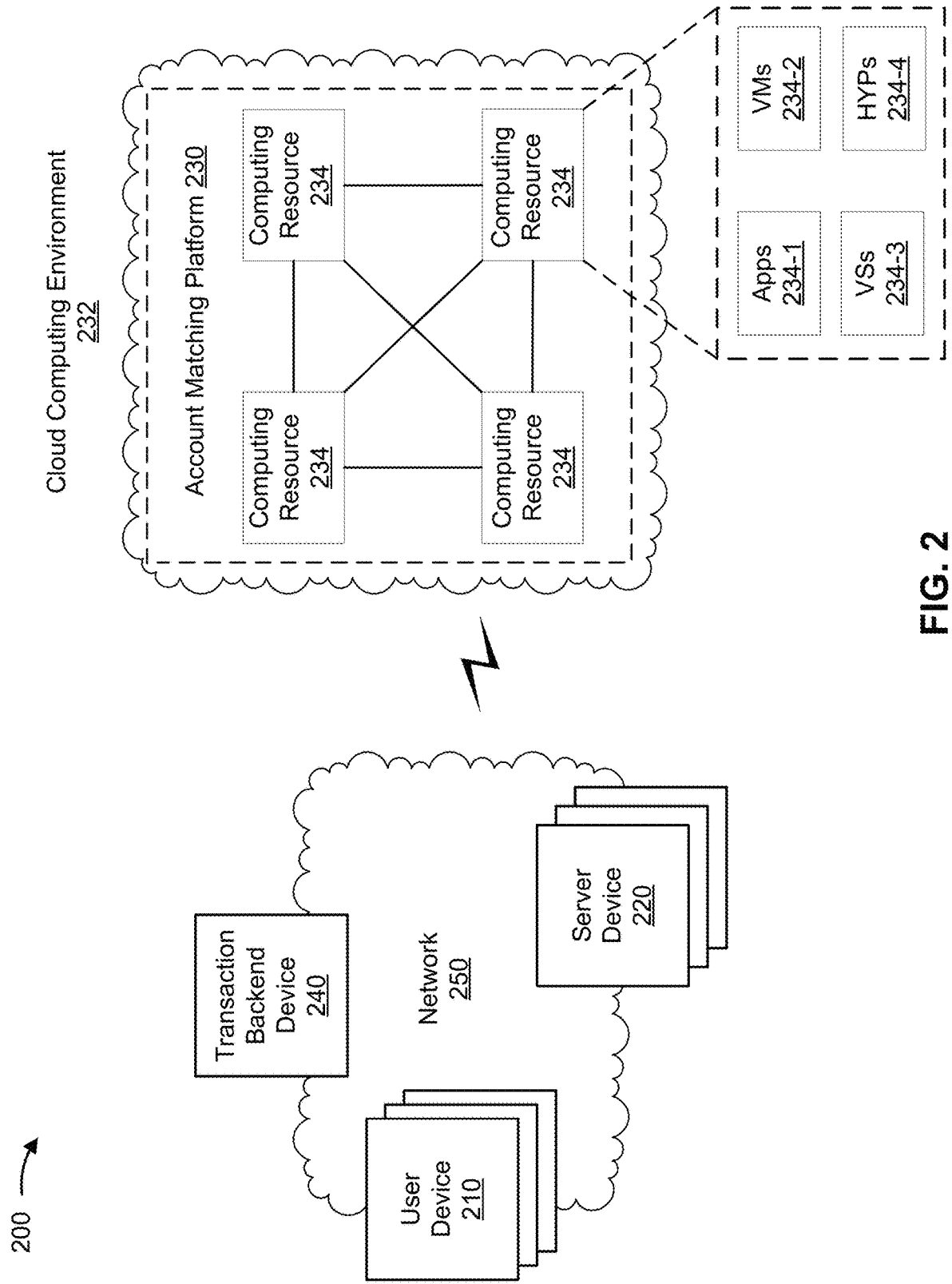
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), a set of server devices 220 (referred to collectively as "server devices 220" and individually as "server device 220"), an account matching platform 230 provided within a cloud computing environment 232 that includes a set of computing resources 234, a transaction backend device 240, and a network 250. Devices of environment 200 may interconnect via wired connections, wireless connections, or a combination of wired and wireless connections.

User device 210 includes one or more devices capable of receiving, generating, storing, processing, and/or providing information associated with an account and/or a transaction for which the account is to be used. For example, user device 210 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to account matching platform 230, information related to an account to be used to complete a transaction and/or a request to use the account to complete a transaction, as described elsewhere herein. Additionally, or alternatively, user device 210 may receive, from account matching platform 230, information that identifies an account selected to be used to complete a transaction, as described elsewhere herein.

Server device 220 includes one or more devices capable of receiving, providing, storing, processing, and/or generating information associated with an account and/or a transaction for which the account is to be used. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may receive information from account matching platform 230 (e.g., for storage), as described elsewhere herein. Additionally, or alternatively, server device 220 may provide stored information to account matching platform 230, as described elsewhere herein.

Account matching platform 230 includes a computing system of one or more devices capable of processing information from user devices 210 and matching accounts with individuals who want to use the accounts to complete transactions. For example, account matching platform 230 may include a cloud server or a group of cloud servers. In some implementations, account matching platform 230 may be designed to be modular, such that certain software components can be swapped in or out depending on a particular need. As such, account matching platform 230 may be easily and/or quickly reconfigured for different uses.

In some implementations, as shown, account matching platform 230 may be hosted in cloud computing environment 232. Notably, while implementations described herein describe account matching platform 230 as being hosted in cloud computing environment 232, in some implementations, account matching platform 230 may not be cloud-based (i.e., may be implemented outside of a cloud computing environment) or may be partially cloud-based.

Cloud computing environment 232 includes an environment that hosts account matching platform 230. Cloud computing environment 232 may provide computation, software, data access, storage, etc. services that do not require end-user knowledge of a physical location and configuration of system(s) and/or device(s) that host account matching platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, one or more computing resources 234 may host account matching platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with account matching platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction backend device 240 includes one or more devices capable of authorizing and/or facilitating a transaction. For example, transaction backend device 240 may include one or more servers and/or computers to store and/or provide information associated with processing a transaction via a transaction terminal. In some implementations, transaction backend device 240 may request information related to an account to be used to complete a transaction, as described elsewhere herein. Additionally, or alternatively, transaction backend device 240 may process a transaction using information related to an account, as described elsewhere herein.

Transaction backend device 240 may include one or more devices associated with a financial institution (e.g., a bank, a lender, a credit union, etc.) and/or a transaction card association that authorizes a transaction and/or facilitates a transfer of funds or payment between an account associated with a cardholder of a transaction card and an account of an individual or business associated with a transaction terminal. For example, transaction backend device 240 may include one or more devices of one or more issuing banks associated with a cardholder of a transaction card, one or more devices of one or more acquiring banks (or merchant banks) associated with a transaction terminal, and/or one or more devices associated with one or more transaction card associations (e.g., VISA®, MASTERCARD®, and/or the like) associated with a transaction card. Accordingly, based on receiving information associated with a transaction card from a transaction terminal, devices of transaction backend device 240 (e.g., associated with a financial institution or transaction card association) may communicate to authorize a transaction and/or transfer funds between the accounts associated with the transaction card and/or the transaction terminal.

Transaction backend device 240 may provide or deny authorization associated with a transaction. For example, transaction backend device 240 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with a transaction card and/or provided by a transaction terminal.

Transaction backend device 240 may include one or more devices associated with a rewards program associated with a transaction card and/or an entity (e.g., a financial institution, a merchant, a service provider, a vendor, and/or the like) associated with the transaction card and/or a transaction terminal. For example, transaction backend device 240 may authorize the earning and/or redemption of rewards (e.g., rewards points associated with a transaction card, cash rewards, client loyalty rewards associated with an entity associated with a transaction terminal, and/or the like) based on a transaction processed by a transaction terminal.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
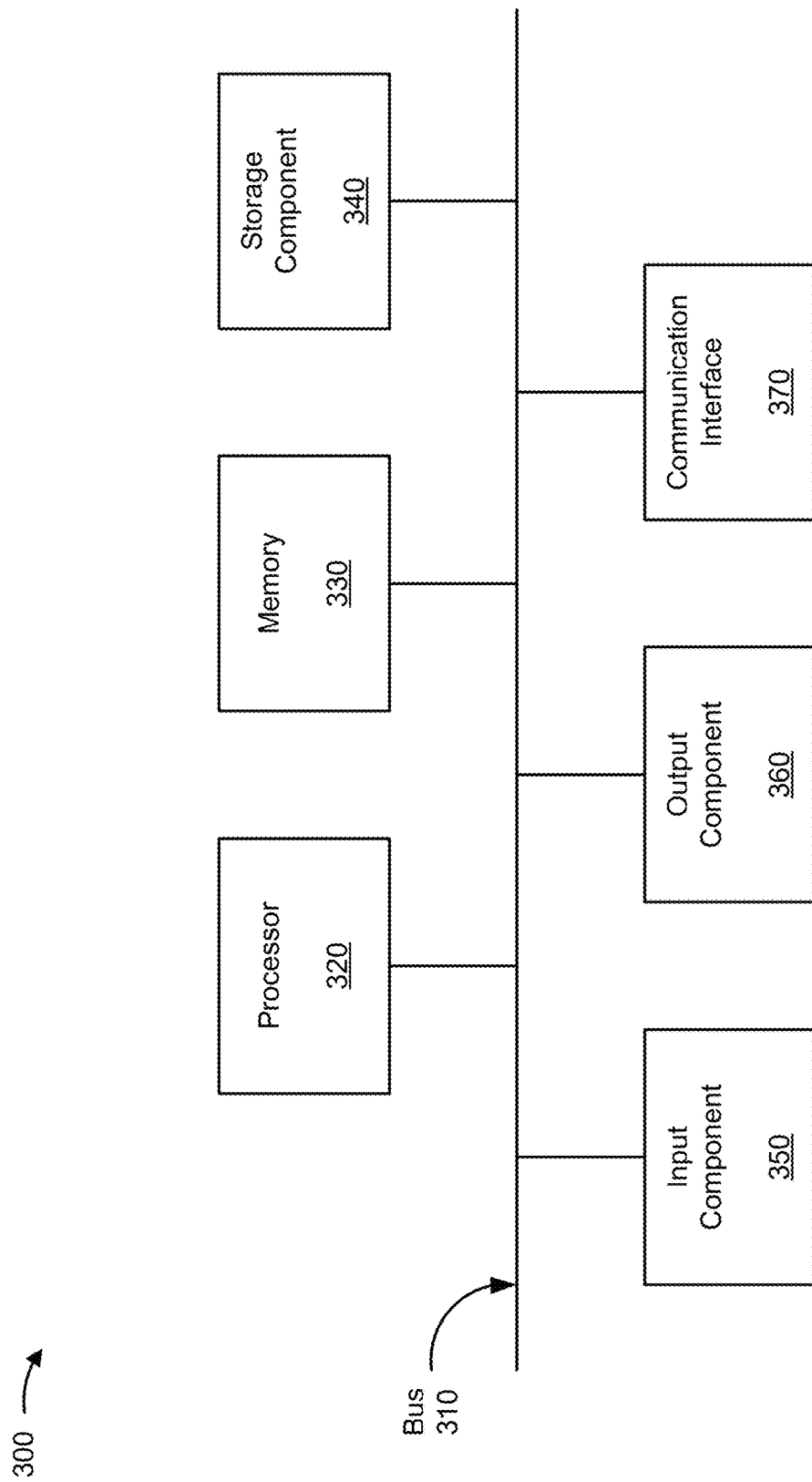
FIG. 3 is a diagram of example components of one or more devices of FIG. 2.

FIG. 3 is a diagram of example components of a device 300. Device 300 may correspond to user device 210, server device 220, account matching platform 230, computing resource 234, and/or transaction backend device 240. In some implementations, user device 210, server device 220, account matching platform 230, computing resource 234, and/or transaction backend device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
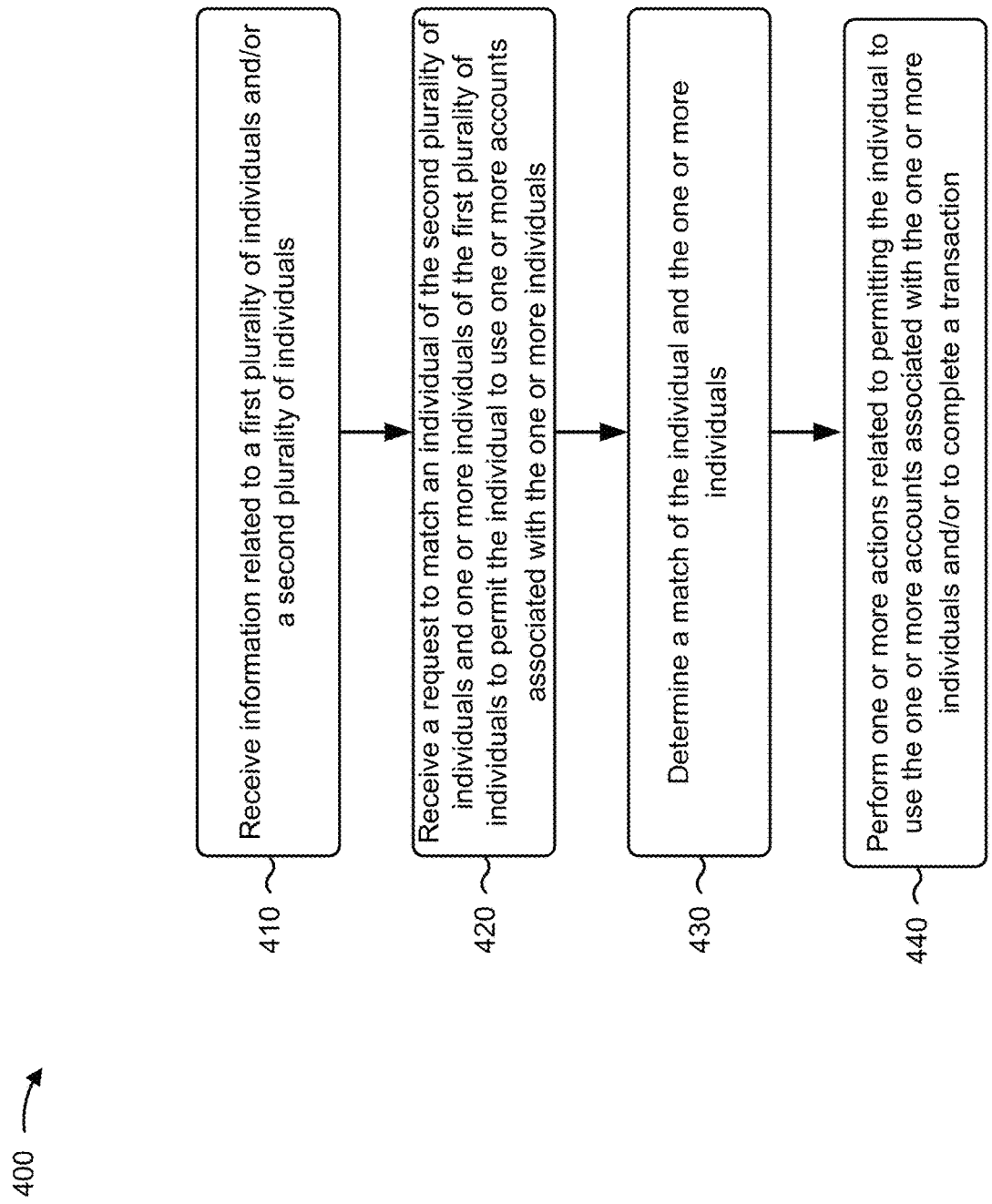
FIG. 4 is a flow chart of an example process for real-time processing of requests related to facilitating use of an account.

FIG. 4 is a flow chart of an example process 400 for real-time processing of requests related to facilitating use of an account. In some implementations, one or more process blocks of FIG. 4 may be performed by account matching platform 230. In some implementations, one or more process blocks of FIG. 4 may be performed by another device or a group of devices separate from or including account matching platform 230, such as user device 210, server device 220, computing resource 234, and/or transaction backend device 240.

As shown in FIG. 4, process 400 may include receiving information related to a first plurality of individuals and/or a second plurality of individuals (block 410). For example, account matching platform 230 may receive information related to a first plurality of individuals and/or a second plurality of individuals. In some implementations, account matching platform 230 may receive information when a user of user device 210 registers with account matching platform 230, when a user of user device 210 inputs the information (e.g., via a user interface of user device 210), based on requesting the information (e.g., from server device 220 and/or a user of user device 210), and/or the like. In some implementations, an individual of the first plurality of individuals may be associated with (e.g., own, control, etc.) an account (e.g., a transaction account, such as a checking account, a rewards account, a loyalty account, a savings account, etc.) (referred to herein as an "account owner"). Additionally, or alternatively, an individual of the second plurality of individuals may be associated with using an account of an account owner (referred to herein as a "potential account user").

In some implementations, an account owner may permit a potential account user to use an account associated with the account owner, such as to complete a transaction. For example, an account owner may own a transaction card that receives cash back on transactions for particular items, such as fuel, groceries, airline tickets, and/or the like. Continuing with the previous example, the account owner may want to receive more cash back than the account owner would otherwise receive through normal use of the account. In this case, the account owner may offer a portion of the cash back to be received to potential account users (e.g., individuals that do not own an account, that have reached a limit on an account, etc.) if the potential account users use the account to complete transactions that result in cash back to the account owners.

Additionally, or alternatively, and as another example, an account owner may own an account that receives a discount for particular types of transactions (e.g., transactions at a particular retailer, transactions for particular events, etc.). Continuing with the previous example, the account owner may have unused discounts that are scheduled to expire, may have unused discounts for a time period, and/or the like. In this case, the account owner may want to offer use of the account to a potential account user in exchange for a fee. In this way, the account owner can receive a fee for use of the account owner's account and the potential account user can receive a discount on a transaction.

Additionally, or alternatively, and as another example, an account owner may own an account that receives rewards points for particular transactions. Continuing with the previous example, the account owner may offer a portion of the rewards points to a potential account user in exchange for the potential account user using the account to complete particular transactions.

In some implementations, information related to a first plurality of individuals may include information related to a plurality of account owners that each own one or more accounts that are made available, via account matching platform 230 as described herein, to be used by potential account users to complete a transaction. For example, the information may identify the plurality of account owners, one or more accounts associated with each of the plurality of account owners, one or more benefits associated with each of the one or more accounts (e.g., cash back for a transaction, rewards points for a transaction, a discount for a transaction, etc.), one or more preferences of each of the plurality of account owners (e.g., past transaction history of a potential account user, repayment terms for permitting the potential account user to use an account, a quantity of transactions per time period for which an account owner wants to permit an account to be used by a potential account user, etc.), and/or the like.

In some implementations, account matching platform 230 may update information identifying a benefit associated with an account (e.g., in real-time, periodically, according to a schedule, based on receiving an indication of a change in a benefit associated with the account, etc.). For example, a particular benefit may be included in a set of benefits, each of which may be available to an account for a limited amount of time, during particular times of the year, are available to accounts associated with individuals that have threshold credit scores, and/or the like. Additionally, or alternatively, and as additional examples, different accounts may receive different amounts of the same benefit. In these cases, account matching platform 230 may communicate with server device 220 to identify current benefits associated with an account (e.g., by requesting an update to a set of benefits to be received in association with use of the account). In this way, account matching platform 230 can accurately determine a benefit to be received in association with use of an account, and/or may maximize a benefit to be received for a particular type of transaction.

In some implementations, information related to a second plurality of individuals may include information related to a plurality of potential account users that want to use one or more accounts of one or more account owners. For example, the plurality of potential account owners may want to use the one or more accounts to complete a transaction. In some implementations, information related to potential account users may identify each of the potential account users, a type of transaction for which a potential account user wants to use an account, an objective related to using an account (e.g., an objective to maximize cash back for a transaction, to minimize a processing fee for a transaction, to receive particular repayment terms for a transaction, to maximize a discount applied to a transaction, etc.), an amount of money in an account associated with the potential account user, a history of the potential account user with respect to using an account of an account owner to complete a transaction, an account of the potential account user that is to use the account of the account owner, a location of the potential account user, and/or the like.

In some implementations, account matching platform 230 may provide, to user device 210, a request to provide information related to an account owner. In some implementations, account matching platform 230 may provide a request to user device 210 associated with an account owner based on determining that one or more benefits associated with an account of the account owner are unused, are within a threshold amount of time of expiring, match information related to a potential account user, and/or the like.

For example, account matching platform 230 may determine that a threshold quantity of potential account users have completed a particular type of transaction (e.g., a retail transaction), and may further determine that an account owner has an account that, if used by a potential account user to complete the particular type of transaction, would result in a benefit to the account owner. In this way, account matching platform 230 may automatically, and in real-time or near real time, identify an account owner that might benefit from permitting a potential account user to use an account associated with the account owner. In some implementations, account matching platform 230 may receive information related to an account owner after providing a request for the information to user device 210 associated with the account owner.

In some implementations, account matching platform 230 may provide, to user device 210 associated with a potential account user, a request to provide information related to the potential account user. In some implementations, account matching platform 230 may provide a request to user device 210 associated with a potential account user based on determining that the potential account user has completed a threshold quantity of a type of transaction for which the potential account user could receive a benefit from using an account of an account owner, based on determining, in real-time or near real-time, that account matching platform 230 is completing a particular type of transaction (e.g., for which the potential account user could receive a benefit from using an account of an account owner), based on determining that user device 210 associated with the potential account owner is at a particular location (e.g., a geographic location, a particular retail location, etc.), based on determining that information related to the potential account user matches information related to one or more account owners, and/or the like. In this way, account matching platform 230 may identify, in real-time or near real-time, a potential account user that might benefit from using an account of an account owner to complete a transaction.

In some implementations, account matching platform 230 may receive information related to an account owner and/or a potential account user via a web interface. For example, an account owner and/or a potential account user may register for a service provided by account matching platform 230 via a web interface associated with account matching platform 230 (e.g., a web interface provided for display via user device 210) and may provide information via the web interface when registering for the service. Additionally, or alternatively, account matching platform 230 may receive information related to an account owner and/or a potential account user via an application (e.g., executing on user device 210 associated with an account owner or a potential account user). For example, an account owner and/or a potential account user may input information via the application in association with registering for a service provided by account matching platform 230, populating a user profile stored by account matching platform 230, and/or the like.

Additionally, or alternatively, account matching platform 230 may receive the information based on a location of an account owner and/or a potential account user. For example, user device 210 may communicate with a wireless beacon device at a location and may receive information related to an account owner and/or a potential account user from user device 210 (e.g., after requesting permission to receive the information from a user of user device 210 via the wireless beacon device and/or after determining the location of user device 210 based on user device 210 communicating with the wireless beacon device). Additionally, or alternatively, and as another example, account matching platform 230 may receive the information based on an account owner and/or a potential account user scanning a quick response (QR) code (e.g., which may cause user device 210 to prompt a user of user device 210 for information, to provide information to account matching platform 230, etc.).

In this way, account matching platform 230 may receive information related to a first plurality of individuals (e.g., account owners) and/or a second plurality of individuals (e.g., potential account users) to permit account matching platform 230 to match the first plurality of individuals and the second plurality of individuals.

As further shown in FIG. 4, process 400 may include receiving a request to match an individual of the second plurality of individuals and one or more individuals of the first plurality of individuals to permit the individual to use one or more accounts associated with the one or more individuals (block 420). For example, account matching platform 230 may receive a request to match a potential account user and one or more account owners to permit the potential account user to use one or more accounts associated with the one or more account owners. In some implementations, account matching platform 230 may receive a request from user device 210, when a user of user device 210 provides input to cause user device 210 to provide a request (e.g., via a user interface of an application executed on user device 210), and/or the like. In some implementations, account matching platform 230 may determine to match a transaction and an account of an account owner based on a request.

In some implementations, a request may relate to matching one or more account owners and a potential account user based on information related to the plurality of account owners and information related to the plurality of potential account users. Additionally, or alternatively, a request may relate to matching offers from one or more account owners and a potential account user. For example, an offer may relate to a division of a benefit received from a transaction (e.g., sharing of cash back, rewards points, etc. for a transaction), a need of an account owner and/or a potential account user (e.g., a need for a discount, a purchase from a particular retailer, etc.), a transaction of a threshold value, and/or the like. Additionally, or alternatively, a request may relate to matching an account of an account owner and a potential account user. For example, a request may relate to matching preferences related to an account of an account owner and preferences of a potential account user, a type of transaction for which the potential account user wants to use the account, and/or the like.

In some implementations, account matching platform 230 may receive a request from a potential account user based on providing information for display to user device 210 associated with the potential account user. For example, account matching platform 230 may determine a location of user device 210 associated with the potential account user (e.g., prior to receiving a request from the potential account user). Continuing with the previous example, account matching platform 230 may determine that an account of an account owner can be used to complete a transaction related to the location of the potential account user and may provide, to user device 210 associated with the potential account user, a notification for display to notify the potential account user of an availability of an account of the account owner that can be used to complete a transaction. In this case, account matching platform 230 may receive a request after providing the notification to user device 210 for display.

In some implementations, account matching platform 230 may receive a request to match based on input via a user interface associated with account matching platform 230 (e.g., a web-based user interface, an interface associated with an application executing on user device 210, etc.). Additionally, or alternatively, account matching platform 230 may receive a request via an application (e.g., executing on user device 210 associated with a potential account user). Additionally, or alternatively, account matching platform 230 may receive a request via a third party portal via which a merchant can be accessed (e.g., via a web browser). Additionally, or alternatively, account matching platform 230 may receive a request via a plugin associated with a browser.

Additionally, or alternatively, account matching platform 230 may receive a request when a potential account user uses a transaction card to complete a transaction (e.g., account matching platform 230 may receive a request automatically and seamlessly without input from a potential account user). For example, account matching platform 230 may automatically receive information related to the transaction (e.g., a location of the transaction, an amount of the transaction, items and/or services being obtained with the transaction, etc.) when the potential account user uses the transaction card to complete the transaction. Continuing with the previous example, account matching platform 230 may process the information to determine whether an account associated with an account owner could be used to complete the transaction, could provide benefits that exceed what the potential account user would receive via use of the transaction card, and/or the like. In this case, the potential account user may have opted-in to such a service.

In some implementations, account matching platform 230 may determine one or more offers for a transaction (e.g., to be presented to a user of user device 210 for selection). For example, an offer may identify a benefit to be received by a potential account user for using an account to complete a transaction, a fee to be charged for using an account to complete a transaction, and/or the like. In some implementations, an offer may be determined on behalf of an account owner that owns an account to be used by a potential account user to complete a transaction. Additionally, or alternatively, an offer may be determined on behalf of a potential account user who is to use an account of an account owner to complete a transaction.

In some implementations, account matching platform 230 may determine an offer based on a benefit associated with an account to be used to complete a transaction (e.g., a percentage of a benefit, a threshold amount of a benefit, etc.), a value of a transaction (e.g., a percentage of a value of a transaction, whether a value of a transaction satisfies a threshold, etc.), historical offers made for similar transactions that were accepted (e.g., as identified using machine learning, artificial intelligence, etc.), a risk associated with a transaction for an account owner of an account to be used to complete the transaction (e.g., whether account matching platform 230 has verified that the potential account user using the account has money to repay the transaction, a credit score for a potential account user that is to use the account, etc.), and/or the like. As a specific example, account matching platform 230 may identify a baseline offer based on historical offers for similar transactions (e.g., transactions for items in similar categories, for transactions that have a value within a threshold of the transaction, etc.) and may adjust the offer (e.g., increase the offer or decrease the offer) based on a value of the transaction.

In this way, account matching platform 230 may receive a request to match an individual of the second plurality of individuals (e.g., a potential account user) and one or more individuals of the first plurality of individuals (e.g., account owners) to permit the potential account user to use one or more accounts associated with the one or more account owners.

As further shown in FIG. 4, process 400 may include determining a match of the individual and the one or more individuals (block 430). For example, account matching platform 230 may determine a match of the individual (e.g., a potential account user) and the one or more individuals (e.g., one or more account owners). In some implementations, account matching platform 230 may determine a match based on receiving a request from user device 210, based on input from a user of user device 210 and/or account matching platform 230, and/or the like. In some implementations, account matching platform 230 may determine a match of individuals, accounts associated with the individuals, offers associated with the accounts, particular transaction cards associated with the accounts (e.g., transaction cards associated with retailers, particular transaction cards associated with a financial institution, etc.), and/or the like.

In some implementations, account matching platform 230 may determine a match based on a request from a potential account user (e.g., based on information related to the potential account user included in the request). For example, account matching platform 230 may determine a location of a potential account user after receiving a request and may determine a match of the potential account user and an account owner based on the location of the potential account user. Additionally, or alternatively, account matching platform 230 may determine a match based on a request to match an offer and a transaction. For example, a request may identify a transaction and/or information related to a transaction (e.g., a type of the transaction, an amount of the transaction, an objective for the transaction, such as receiving a threshold quantity of rewards points, etc.), and account matching platform 230 may identify one or more offers associated with accounts that match the transaction and/or the information related to the transaction (e.g., that can satisfy the objective).

In some implementations, account matching platform 230 may determine a match based on one or more preferences associated with a potential account user and/or an account owner. For example, account matching platform 230 may process information related to the potential account user and/or the account owner to identify one or more preferences related to the potential account user and/or the account owner and may determine a match of the potential account user and the account owner based on the one or more preferences.

Additionally, or alternatively, account matching platform 230 may determine a match based on a type of transaction for which an account of an account owner is to be used. For example, account matching platform 230 may process information included in a request from a potential account user to identify a type of a transaction for which an account associated with the account owner is to be used. Continuing with the previous example, account matching platform 230 may identify an account of the account owner as a match for the potential account user based on the account being associated with the type of transaction, being associated with a threshold amount of benefits for the type of transaction, being associated with one or more types of transactions identified by a preference of the account owner, and/or the like.

Additionally, or alternatively, account matching platform 230 may determine a match based on an amount of a transaction. For example, account matching platform 230 may process information included in a request from a potential account user to identify an amount of a transaction. Continuing with the previous example, account matching platform 230 may determine a match based on an amount of a transaction satisfying a threshold (e.g., indicating a threshold level of risk associated with the transaction), being associated with an amount of benefits that satisfies a threshold, whether an amount associated with a transaction is less than an amount of credit remaining for a line of credit of the account owner, and/or the like.

Additionally, or alternatively, account matching platform 230 may determine a match based on an objective to be optimized (e.g., an objective to be maximized, to be minimized, to be satisfied, etc.). For example, an objective may include an amount of cash back received in association with a transaction, an amount of rewards points received in association with a transaction, an amount of a discount applied to a transaction, and/or the like. In some implementations, account matching platform 230 may determine to optimize an objective associated with a transaction. For example, account matching platform 230 may process information related to an account owner and/or a potential account user to determine an objective to optimize, may process information included in a request to determine an objective to optimize, and/or the like.

In some implementations, account matching platform 230 may use machine learning, artificial intelligence, and/or the like to determine a match. In some implementations, account matching platform 230 may generate a model for matching account owners and potential account users (e.g., using training data that identifies matches between the account owners and the potential account users, historical data that identifies matches between the individuals and the other individuals, etc.). For example, a generated model may relate to potential account users that an account owner has selected in the past, offers that a potential account user has selected in the past, and/or the like. In some implementations, account matching platform 230 may use a generated model to match account owners and potential account users for transactions.

In this way, account matching platform 230 may process unstructured data related to account owners and/or potential account users to determine a match (e.g., data that cannot be processed by a human actor), thereby increasing an efficiency of matching the account owners and the potential account users. Additionally, or alternatively, in this way, account matching platform 230 may identify matches using data where algorithmic methods consume significant computing resources and/or a significant amount of time, thereby conserving computing resources of account matching platform 230 and/or reducing an amount of time needed to determine a match.

In some implementations, account matching platform 230 may identify values for one or more factors related to a potential account user, a transaction, or an account owner. For example, the one or more factors may include a value of a transaction, a location of the transaction, an item and/or service being obtained with the transaction, a preference of an account owner or a potential account user, a benefit associated with an account, an objective associated with the transaction and/or an account, and/or the like.

In some implementations, account matching platform 230 may perform a comparison of values for one or more factors related to a potential account user, a transaction, and/or an account owner. For example, account matching platform 230 may determine whether a value satisfies a threshold, whether a value for a first factor satisfies a value for a second factor, and/or the like. In some implementations, account matching platform 230 may determine scores for different combinations of a potential account user, a transaction, and/or account owners based on a result of performing a comparison. For example, account matching platform 230 may determine a first score for a first combination (e.g., where values of factors satisfy corresponding thresholds), a second score for a second combination (e.g., where values of factors for the second combination satisfy values for factors for another combination), and/or the like. In some implementations, account matching platform 230 may determine a match based on a score for a combination satisfying a threshold and may output a list of accounts that match a potential account user and/or a transaction.

In some implementations, account matching platform 230 may determine a score for an account owner and/or a potential account user. For example, a score may indicate an extent to which the account owner and the potential account user match, an extent to which an account owner and a potential account user match, an extent to which an account owner and a transaction match, and/or the like. Continuing with the previous example, a score may indicate an extent to which information related to the account owner and the potential account user match, an extent to which an offer from the account owner matches a transaction and/or a preference related to the potential account user, an amount of a benefit that can be received in association with using an account of the account owner to complete a transaction, an extent to which an objective can be optimized, an extent to which information related to the account owner or the potential account user satisfies a preference of the account owner and/or the potential account user, and/or the like.

In some implementations, a score may be a weighted score (e.g., where different information related to an account owner or a potential account user is weighted differently, where different factors, such as a preference, an objective, a benefit, etc., are weighted differently, etc.), an average score (e.g., of scores for information and/or factors related to the account owner or the potential account user, of scores for multiple iterations of matching account owners and potential account users, etc.), and/or the like. In some implementations, account matching platform 230 may determine scores for values of multiple factors and may determine a score for an account owner, a transaction, and/or a potential account user based on the scores for the multiple factors (e.g., an average of the scores, based on different weightings for the scores, etc.).

In some implementations, account matching platform 230 may receive information that identifies a rank of factors to be used to identify an account, an offer, and/or an individual. In some implementations, account matching platform 230 may determine a score based on the information identifying the rank of the factors. For example, account matching platform 230 may adjust a score for an individual, an account, or an offer based on the rank of factors.

In some implementations, account matching platform 230 may determine a match based on a score for an account owner and/or a potential account user. For example, account matching platform 230 may determine a match by identifying the highest score relative to other scores, a score that satisfies a threshold, and/or the like.

As a specific example, account matching platform 230 may use information that identifies a credit score of a potential account user, a value of a transaction, a transaction history of a potential account user, whether the potential account user is a preferred user of account matching platform 230, a quantity of transactions that the potential account user has completed using account matching platform 230, and/or the like. In some implementations, account matching platform 230 may identify potential account owners whose preferences match the information. Additionally, or alternatively, account matching platform 230 may generate a score for the potential account user (e.g., a score based on the information, a score that indicates a match between the information and preferences of an account owner, etc.). In some implementations, account matching platform 230 may select one of the account owners as a match for the potential account user. For example, account matching platform 230 may select an account owner for which the score related to the potential account user is highest relative to other scores associated with other account owners, and/or the like.

In some implementations, account matching platform 230 may provide, to user device 210 for display, information identifying matched individuals, accounts, offers, and/or the like. For example, account matching platform 230 may provide, to user device 210 associated with a potential account user, information identifying other individuals, accounts, offers, and/or the like with which the potential account user was matched. Additionally, or alternatively, and as another example, account matching platform 230 may provide, to user device 210 associated with an account owner, information identifying other individuals, accounts, offers, and/or the like with which the individual is matched.

In some implementations, account matching platform 230 may receive, from user device 210, a selection of an individual, an account, an offer, and/or the like (e.g., after providing a notification to request input to approve use of an account to complete a transaction). For example, a user of user device 210 may input a selection related to using an account to complete a transaction. In some implementations, account matching platform 230 may provide, for display via user device 210, a notification that an individual, an account, and/or an offer and another individual, another account, and/or another offer have been matched. Additionally, or alternatively, account matching platform 230 may provide, for display via user device 210, a notification that a particular individual, account, and/or offer has been selected to complete a transaction.

In some implementations, account matching platform 230 may select an individual, an account, and/or an offer for a transaction. For example, account matching platform 230 may determine offers for a transaction based on benefits associated with accounts related to the offers (e.g., a percentage of the benefits, a threshold value, etc.), based on other offers presented for similar transactions (e.g., identified using machine learning, artificial intelligence, etc.), and/or the like, and may select an offer (e.g., an offer with the highest score, an offer optimizes an objective, etc.). In some implementations, an offer may relate to a benefit that is shared with an individual using another individual's account to complete a transaction. In some implementations, account matching platform 230 may provide, to user device 210, information identifying various offers to permit a user of user device 210 to select an offer.

In some implementations, account matching platform 230 may determine that a potential account user is to use an account (e.g., a benefit account) to complete a transaction (e.g., based on selection of the account by a potential account user, based on selection of the account by account matching platform 230, etc.). In some implementations, account matching platform 230 may store information identifying that a potential account user is to use an account to complete a transaction. For example, storing this information may facilitate use of the account by the potential account user.

In this way, account matching platform 230 may determine a match of the individual (e.g., a potential account user) and the one or more individuals (e.g., account owners).

As further shown in FIG. 4, process 400 may include performing one or more actions related to permitting the individual to use the one or more accounts associated with the one or more individuals and/or to complete a transaction (block 440). For example, account matching platform 230 may perform one or more actions related to permitting the individual (e.g., a potential account user) to use the one or more accounts (e.g., facilitating use of the one or more accounts) associated with the one or more individuals (e.g., account owners) and/or to complete a transaction. In some implementations, account matching platform 230 may perform one or more actions after determining a match of a potential account user and one or more account owners.

In some implementations, account matching platform 230 may provide, to user device 210, server device 220, transaction backend device 240, and/or a transaction terminal, account information (e.g., encrypted information that identifies an account, a financial institution related to the account, a PIN, an identifier associated with a transaction card, etc.) to be used to complete a transaction. For example, account matching platform 230 may provide account information to server device 220 to complete an online transaction. Additionally, or alternatively, and as another example, account matching platform 230 may provide account information to user device 210 so that user device 210 can be used to complete a mobile payment transaction. Additionally, or alternatively, and as another example, account matching platform 230 may provide account information to a transaction terminal and/or transaction backend device 240 so that the transaction terminal and/or transaction backend device 240 can approve a transaction, can complete a transaction, and/or the like.

In some implementations, account matching platform 230 may provide, to transaction backend device 240 and/or a transaction terminal, information that indicates that a potential account user will be completing a transaction using an account associated with an account owner. In some implementations, the information indicating that the potential account user will be completing a transaction using an account associated with the account owner may cause transaction backend device 240 and/or a transaction terminal to modify operations of transaction backend device 240 and/or the transaction terminal related to verifying account information to complete a transaction. For example, when account matching platform 230 provides account information and/or information indicating that a potential account user will be using the account to complete a transaction to a transaction terminal and/or transaction backend device 240, the transaction terminal and/or transaction backend device 240 may not request input of account information from a user of the transaction terminal, may request input of information related to the user of the transaction terminal (e.g., a username/password combination, a PIN, etc.) rather than account information related to the account that the user is using, and/or the like.

In some implementations, account information that account matching platform 230 provides may be encrypted. For example, encrypted account information may be provided to account matching platform 230 and/or transaction backend device 240 from user device 210 to complete a transaction and account matching platform 230 and/or transaction backend device 240 may decrypt the account information to complete the transaction. Additionally, or alternatively, and as another example, account information may be provided in the form of a security token that user device 210 and/or another device provides to transaction backend device 240 and/or account matching platform 230 to complete a transaction. In some implementations, account matching platform 230 may store a record that limits use of account information. For example, account matching platform 230 may limit use of account information or a security token to a particular amount of time after providing the account information or the security information, to a particular transaction (e.g., based on receiving, from transaction backend device 240, information that identifies a transaction for which the account information is to be used), and/or the like.

In some implementations, account matching platform 230 may store information identifying a potential account user as an authorized user of an account (e.g., may update an account to identify the potential account user as an authorized user of the account). For example, an account owner may input information to account matching platform 230 to identify the potential account user as an authorized user. Additionally, or alternatively, and as another example, when account matching platform 230 matches an account owner and a potential account user, account matching platform 230 may store information identifying the potential account user as an authorized user of an account of the account owner. This facilitates use of an account by a potential account user, by permitting the potential account user to use the account as an authorized user. In some implementations, account matching platform 230 may store information identifying a potential account user as an authorized user for a particular period of time, until an account owner removes an indication that the potential account user is an authorized user, until a particular transaction has been completed, based on a timer that indicates an amount of time during which a potential account user is to be an authorized user of an account (e.g., based on detecting expiration of the timer after starting the timer), and/or the like.

In some implementations, to facilitate use of an account by a potential account user identified as an authorized user, account matching platform 230 may provide information to user device 210 associated with the potential account user to configure user device 210 to store a virtual transaction card on user device 210 associated with the account. Additionally, or alternatively, account matching platform 230 may provide a security token to user device 210 that stores account information for an account and/or permits a holder of the security token to complete a transaction using an account. Additionally, or alternatively, account matching platform 230 may provide a security token to transaction backend device 240 and/or a transaction terminal so that transaction backend device 240 and/or the transaction terminal can verify a security token provided by a potential account user when using an account to complete a transaction.

Additionally, or alternatively, a potential account user may log in to account matching platform 230 and may use an account associated with an account owner to complete a transaction (e.g., where a dashboard associated with account matching platform 230 displays accounts for which the potential account user is identified as an authorized user of the account but without showing the potential account user account information for the account). This permits the potential account user to use an account of an account owner without having access to account information related to the account, thereby increasing security of the account when a non-account owner is using the account. Additionally, or alternatively, account matching platform 230 may send a message to server device 220 to cause a financial institution to issue a potential account user a transaction card (e.g., when a potential account user and an account owner are matched for a longer term relationship, such as weeks, months, years, etc.).

Additionally, or alternatively, account matching platform 230 may provide information to transaction backend device 240 to cause transaction backend device 240 to cause a transaction terminal to request identifying information for the potential account user rather than the account owner if the potential account user is completing an in-person transaction. Additionally, or alternatively, account matching platform 230 may cause transaction backend device 240 to complete a transaction using information identifying a potential account user when the potential account user inputs the information to complete an online transaction. Additionally, or alternatively, account matching platform 230 may provide a push notification to user device 210 associated with an account owner to request input from the account owner to approve use of an account associated with the account owner by a potential account user.

In some implementations, account matching platform 230 may determine whether an account associated with a potential account user has an amount of money that can repay (plus interest, fees, etc.) an account owner for a transaction based on information related to the potential account user using an account associated with the account owner, whether the amount of money satisfies a threshold, and/or the like. For example, account matching platform 230 may receive, from server device 220, information related to an account of a potential account user, and account matching platform 230 may process the information to determine whether the amount of money in the account satisfies a threshold.

In some implementations, account matching platform 230 may receive an amount of money from an account of an individual that used an account owner's account prior to performing an action to complete a transaction using the account owner's account (e.g., to ensure repayment for the account owner, to reduce risk for the account owner, etc.). In some implementations, account matching platform 230 may perform an action to complete a transaction after receiving an amount of money from an account of a potential account user.

In some implementations, account matching platform 230 may provide, to a transaction card associated with an individual who is to use another individual's account, a set of instructions to reconfigure the transaction card. For example, the set of instructions may cause the transaction card to reconfigure to use account information associated with an account of an account owner (e.g., so that the individual can use the account to complete a point-of-sale transaction).

In some implementations, account matching platform 230 may update one or more records. For example, account matching platform 230 may update a record related to an account that is used to complete a transaction (e.g., to identify that the account was used to complete the transaction). Additionally, or alternatively, and as another example, account matching platform 230 may update a record to reflect that an individual used an account associated with an account owner to complete a transaction (e.g., to identify that the individual used the account to complete the transaction). Additionally, or alternatively, account matching platform 230 may update a record related to an account to identify that the account and a transaction have been matched. In some implementations, account matching platform 230 may update the one or more records after completing a transaction.

In some implementations, account matching platform 230 may receive information related to a transaction that has been completed (e.g., an amount of the transaction, an account owner of an account used to complete the transaction, an individual that used the account, a set of benefits received for using the account to complete the transaction, etc.). In some implementations, account matching platform 230 may identify an offer that corresponds to the transaction (e.g., so that account matching platform 230 may determine a manner in which to divide a set of benefits among various accounts). For example, account matching platform 230 may perform a lookup of an identifier that identifies the transaction and/or the account used to complete the transaction in a data structure to identify a corresponding offer associated with the transaction.

In some implementations, account matching platform 230 may determine a manner in which to divide a set of benefits among various accounts based on the offer (e.g., an account associated with an account owner and an account associated with a potential account user). For example, the offer may identify a percentage of rewards points received that each of the accounts are to receive, an amount of money to be provided to the account of the potential account user for each rewards point received for completing the transaction, a percentage of a discount by the potential account user for using the account to be charged to the account of the potential account user for use of the account, a schedule of values to be provided to the potential account user for different transaction amounts and/or amounts of benefits received by the account owner, and/or the like. In some implementations, account matching platform 230 may process data related to an offer to identify a manner in which to divide a set of benefits (e.g., using a text processing technique, such as natural language processing, text analysis, optical character recognition (OCR), etc. to identify terms, phrases, numbers, symbols, etc. in text of an offer).

In some implementations, account matching platform 230 may determine whether to provide the same type of benefit, or different types of benefits, to various accounts for completing a transaction. For example, account matching platform 230 may determine whether to provide the same type of benefit, or different types of benefits, based on a type of benefit received for completing a transaction, an amount of a benefit received for completing a transaction, a conversion ratio of a benefit to money, and/or the like. Continuing with the previous example, account matching platform 230 may determine to provide money to an account owner for a discount received by a potential account owner, may determine to provide money to a potential account user for use of an account that received rewards points (e.g., where a threshold quantity of rewards points are equivalent to one dollar), and/or the like. In some implementations, account matching platform 230 may update various accounts with the same type or different types of benefits.

In some implementations, account matching platform 230 may modify a manner in which a set of benefits is to be divided based on one or more other offers. For example, account matching platform 230 may modify a first offer to match a second offer associated with another account, may modify a first offer to match an average of other offers, may modify a first offer to be more beneficial for an individual based on a history of the individual using accounts to complete transactions, and/or the like.

In some implementations, account matching platform 230 may update various accounts to include corresponding portions of benefits divided among the various accounts. For example, account matching platform 230 may update benefit accounts associated with the account owner and/or the potential account user, may credit or debit transaction accounts associated with the account owner and/or the potential account user, and/or the like. In some implementations, account matching platform 230 may update an account by providing, to server device 220 that hosts the account, information that identifies a portion of a benefit to be received by the account.

In some implementations, account matching platform 230 may output a report after the account has been updated and the report has been generated (e.g., a report that includes information related to a transaction and/or a benefit received in association with completing the transaction). Additionally, or alternatively, account matching platform 230 may send a message to user device 210 (e.g., of an account owner or a potential account user) to indicate that the transaction has been completed, that identifies a set of benefits that have been divided among various accounts, and/or the like. Additionally, or alternatively, account matching platform 230 may request feedback (e.g., a rating, a comment, etc.) regarding use of the account to complete a transaction (e.g., via user device 210 of an account owner or a potential account user) and may update a record related to the account owner or the potential account user based on the feedback.

In some implementations, account matching platform 230 may complete a transaction using the account (e.g., by confirming that a potential account user is an authorized user of an account, confirming authenticity of a security token, etc.). In some implementations, account matching platform 230 may perform an action to prevent a potential account user from using an account for another transaction based on the transaction being completed (e.g., may revoke a security token, may remove an indication of the individual being an authorized user of the account, etc.). As a specific example, account matching platform 230 may provide, to transaction backend device 240, information to prevent a security token associated with permitting use of an account from being used for a transaction.

In some implementations, account matching platform 230 may generate an account for an individual by communicating with server device 220. For example, when a benefit, such as rewards points, is shared with an individual, account matching platform 230 may communicate with server device 220 to generate an account for the rewards points for the individual.

In some implementations, account matching platform 230 may provide, to transaction backend device 240, a set of instructions to process a transaction. For example, account matching platform 230 may provide the set of instructions after providing a notification to user devices 210 associated with an account owner and a potential account owner indicating that the account owner and the potential account user have been matched.

In some implementations, the set of instructions may configure transaction backend device 240 and/or a transaction terminal to process a security token generated by account matching platform 230. Additionally, or alternatively, the set of instructions may configure transaction backend device 240 and/or a transaction terminal to communicate with account matching platform 230 to complete the transaction (e.g., so that account matching platform 230 can confirm authenticity of a security token, can confirm that a potential account user is an authorized user of an account, etc.). Additionally, or alternatively, the set of instructions may configure transaction backend device 240 and/or a transaction terminal to request information related to a potential account user, rather than an account owner, when completing a transaction. In some implementations, account matching platform 230 may provide, to transaction backend device 240 and/or a transaction terminal, a notification that a transaction has been completed using an account.

In some implementations, account matching platform 230 may receive, from transaction backend device 240 and/or a transaction terminal, a request to approve use of an account (e.g., a benefit account and/or a transaction account) to complete a transaction.

In some implementations, account matching platform 230 may determine that a potential account user is an authorized user of an account. For example, account matching platform 230 may determine that a potential account user is an authorized user by processing information included in a data structure that identifies a set of authorized users for an account. In some implementations, account matching platform 230 may determine, based on information from transaction backend device 240 and/or a transaction terminal, that a security token provided by a potential account user in association with completing a transaction was generated for the potential account user (e.g., by performing a lookup of information that identifies a security token provided to transaction backend device 240 and/or a transaction terminal in a data structure of generated security tokens and corresponding potential account users). In this way, account matching platform 230 may authenticate a security token received by transaction backend device 240 and/or a transaction terminal in association with a potential account user using an account of an account owner to complete a transaction.

In some implementations, account matching platform 230 may determine that a potential account user is an authorized user of an account based on one or more factors. For example, the one or more factors may include a value of a transaction, a type of a transaction, a location of a transaction, and/or the like. Continuing with the previous example, a potential account user may be an authorized user if a value for a transaction satisfies a threshold, is being completed at a particular location, is a particular type of transaction (e.g., a purchase of gas or groceries), and/or the like.

In some implementations, account matching platform 230 may perform an action to withdraw a value from a transaction account associated with a potential account user after determining that the potential account user is an authorized user of the account and/or prior to the transaction being completed. For example, the value withdrawn may satisfy another value associated with the transaction (e.g., may be used to repay an account owner for using the account to complete the transaction when the account is a transaction account), may satisfy a fee associated with using the account to complete the transaction (e.g., may be used to pay a fee), and/or the like.

In some implementations, account matching platform 230 may store the value prior to prior to providing the value to an account associated with an account owner (e.g., pending approval of the transaction). In some implementations, account matching platform 230 may update an account associated with an account owner with a portion of a value withdrawn from an account of a potential account user (e.g., after a fee has been charged to the value by a third party associated with account matching platform 230). In some implementations, account matching platform 230 may withdraw the value after verifying that a transaction account of a potential account user has sufficient value for the value to be withdrawn.

In some implementations, account matching platform 230 may provide, to user device 210 associated with a potential account user, information that indicates that a value has been withdrawn. In some implementations, account matching platform 230 may provide a withdrawn value to an account associated with an account owner (e.g., a transaction account associated with the account owner).

In some implementations, account matching platform 230 may provide, to transaction backend device 240 and/or the transaction terminal, a set of instructions to approve the use of the account by a potential account user. In some implementations, the set of instructions may indicate that the individual is an authorized user of an account, associated with an account owner, that is being used to complete a transaction. In some implementations, account matching platform 230 may request, from an account owner (e.g., via user device 210 associated with the account owner), approval to complete a transaction using an account associated with the account owner and may notify transaction backend device 240 and/or a transaction terminal that the account owner has approved the transaction. This improves security of an account by requesting confirmation of use of the account from the account owner prior to completing the transaction.

In some implementations, account matching platform 230 may cause a benefit received by an account of an account owner (e.g., a benefit account) to be shared among the account and a benefit account of a potential account user, similar to that described elsewhere herein. In some implementations, account matching platform 230 may receive, from server device 220, a benefit to be shared among various accounts based on a particular account being used to complete a transaction (e.g., prior to dividing the benefit among the various accounts). In some implementations, account matching platform 230 may provide a set of instructions to server device 220 to generate a benefit account for a potential account user, in a manner similar to that described elsewhere herein, prior to causing a benefit to be shared.

In some implementations, account matching platform 230 may monitor repayment of an amount of money related to a transaction. For example, account matching platform 230 may monitor an account associated with an individual that used an account owner's account to determine whether the individual has provided a payment to the account owner, an amount of the payment, whether the payment was provided and/or received by a deadline, and/or the like. In some implementations, account matching platform 230 may perform an action to facilitate repayment of an amount of money related to a transaction. For example, account matching platform 230 may send a message to user device 210 associated with an individual that used an account owner's account to notify the individual that a payment is due.

Additionally, or alternatively, account matching platform 230 may determine a schedule for repaying an amount of money for a transaction. Additionally, or alternatively, and as another example, account matching platform 230 may generate a calendar item on an electronic calendar associated with an individual that used an account owner's account to notify the individual that a payment is due. Additionally, or alternatively, and as another example, account matching platform 230 may request, from an individual via user device 210 associated with the individual, permission to setup automatic withdrawal of money from an account associated with the individual to repay an account owner for use of the account owner's account. Additionally, or alternatively, account matching platform 230 may withdraw money from an account of an individual and provide the money to another account of an account owner. For example, prior to completing a transaction using an account owner's account, account matching platform 230 may communicate with server device 220 associated with a financial institution associated with the potential account user to verify that an account associated with the potential account user has sufficient money to repay the account owner for use of the account owner's account. In some implementations this may be performed automatically as part of the transaction.

In some implementations, account matching platform 230 may receive updated information related to an account, an account owner, a potential account user, and/or the like. For example, account matching platform 230 may receive updated information related to benefits associated with an account (e.g., an amount of cashback received for an account, an amount of rewards points received for an account, etc.) in real-time or near real-time.

Additionally, or alternatively, account matching platform 230 may provide a set of directions, for display, to a location of an account owner. For example, account matching platform 230 may match an account owner and a potential account user based on the account owner and the potential account user being within a threshold distance from each other, being at the same location, and/or the like. In this way, account matching platform 230 may facilitate an in-person transaction using an account owner's account. For example, the account owner may use a transaction card, may input an account number via a transaction terminal, and/or the like to complete the potential account owner's transaction.

In this way, account matching platform 230 may perform one or more actions related to permitting the individual (e.g., a potential account user) to use the one or more accounts associated with the one or more individuals (e.g., account owners) and/or to complete a transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
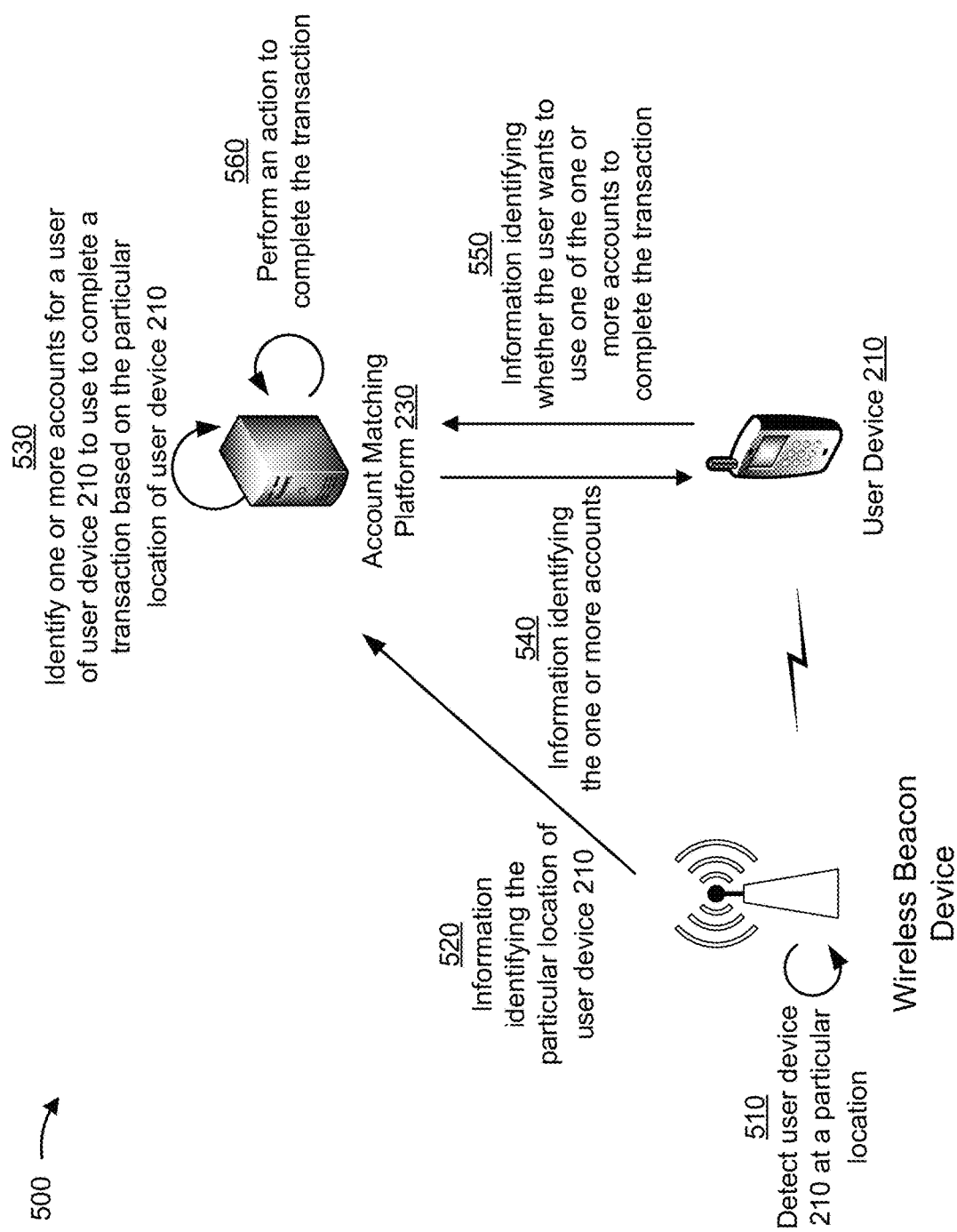
FIG. 5 is a diagram of an example implementation relating to the example process shown in FIG. 4.

FIG. 5 is a diagram of an example implementation 500 related to the example process shown in FIG. 4. FIG. 5 shows an example of account matching platform 230 determining a location of a potential account user and identifying an account for the potential account user to use based on the location of the potential account user.

As shown in FIG. 5, and by reference number 510, a wireless beacon device may detect user device 210 at a particular location (e.g., user device 210 associated with a potential account user). For example, the wireless beacon device may be located at a retail location of an organization. In some implementations, the wireless beacon device may detect user device 210 when user device 210 is within communicative proximity of the wireless beacon device. In some implementations, the wireless beacon device may communicate with user device 210 via network 250, via a Bluetooth connection, via a near-field communication (NFC) connection, and/or the like. As shown by reference number 520, the wireless beacon device may provide, to account matching platform 230, information identifying the particular location of user device 210.

As shown by reference number 530, account matching platform 230 may identify one or more accounts for a user of user device 210 to use to complete a transaction based on the particular location of user device 210. For example, account matching platform 230 may identify one or more accounts associated with the retailer at which user device 210 is located, one or more accounts associated with a type of retailer associated with the location (e.g., an electronics retailer, a home goods retailer, a grocery store, etc.), and/or the like.

As a specific example, account matching platform 230 may determine that user device 210 is located at a home improvement store and that the user of user device 210 does not own an account that provides a benefit for transactions associated with the home improvement store, associated with home improvement stores generally, and/or the like. Continuing with the previous example, account matching platform 230 may identify one or more accounts that are associated with cash back on home improvement store transactions, cash back on transactions at the home improvement store, particular lending terms for transactions at the home improvement store (e.g., no cash down on purchases, zero percent interest for an amount of time, etc.), and/or the like. In this way, account matching platform 230 may identify one or more accounts from which the user of user device 210 can select an account to use to complete a transaction. In addition, if the user of user device 210 completes the transaction using one of the one or more accounts, benefits resulting from use of the account can be shared among the user of user device 210 and the account owner of the account.

In some implementations, if the wireless beacon device is located at a checkout lane of a retailer, the wireless beacon device may request, from a corresponding transaction terminal, information related to a transaction associated with a user of user device 210. In some implementations, account matching platform 230 may identify one or more accounts based on the transaction (e.g., based on an item or a type of item, such as an electronics item, food, clothing, etc., associated with the transaction, a type of the transaction, such as retail, gas, groceries, etc., an amount of the transaction, and/or the like). In this way, account matching platform 230 may identify, in real-time or near real-time, accounts that can be used to complete a transaction based on a location of a potential account user associated with the transaction.

As shown by reference number 540, account matching platform 230 may provide, to user device 210, information identifying the one or more accounts. In some implementations, account matching platform 230 may provide, in association with information identifying the one or more accounts, information that identifies an offer corresponding to each of the one or more accounts, a benefit corresponding to each of the one or more accounts, a score associated with each of the one or more accounts, and/or the like.

In some implementations, user device 210 may provide a notification for display that indicates an availability of the one or more accounts for use, that an indication identifying a potential account user as an authorized user of an account has been added to the account (e.g., after adding the indication), and/or the like. Additionally, or alternatively, user device 210 may open an application to provide, for display, information related to the one or more accounts and/or to permit a user of user device 210 to select an account to use. As shown by reference number 550, user device 210 may provide, to account matching platform 230, information identifying whether the user wants to use one of the one or more accounts to complete the transaction. Additionally, or alternatively, user device 210 may provide information identifying a selection of an account that the user wants to use. As shown by reference number 560, user device 210 may perform an action to complete the transaction, similar to that described elsewhere herein.

As indicated above, FIG. 5 is provided merely as an example. Other examples are possible and may differ from what was described with regard to FIG. 5.

The implementations described herein may apply to matching individuals that do not know each other (e.g., untrusted individuals) and to matching individuals that know each other (e.g., trusted individuals).

In this way, account matching platform 230 may dynamically match accounts and transactions for which the accounts can be used. This permits benefits associated with the accounts to be optimized. In addition, this reduces or eliminates unused benefits and/or lines of credit associated with accounts. Further, this provides a secure way for individuals to be provided with limited use of an account, thereby increasing a flexibility of use of an account while maintaining security of the account.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device having one or more processors, a request, associated with a first account, to use a second account to complete a transaction,
      wherein the first account is associated with a first individual,
      wherein the second account is associated with a second individual, and
      wherein the second account is associated with a set of benefits to be received based on completing the transaction;
   training, by the device, a machine learning model based on historical training data that identifies matches between historical account owners and potential account users;
   determining, by the device and based on using the trained machine learning model, a match between the first individual and the second individual, wherein the second individual is associated with a potential account and wherein the match between the first individual and the second individual is also a match between the first account and the potential account,
  wherein determining the match between the first account and the potential account comprises:
    selecting the potential account as the second account to use to complete the transaction;
determining, by the device, a manner in which to divide the set of benefits between the first account and the second account;
updating, by the device, the first account and the second account to include corresponding portions of the set of benefits based on determining the manner in which to divide the set of benefits; and
providing, by the device, a notification to a transaction terminal or a transaction backend device to cause the transaction terminal or the transaction backend device to request information related to the first individual rather than the second individual when the first individual is using the second account to complete the transaction.

2. The method of claim 1, wherein the request further comprises one or more of:
information that identifies a type of transaction associated with the transaction,
information related to an account of the first individual, or
a set of credentials associated with the first individual.

3. The method of claim 1, wherein receiving the request comprises:
receiving the request automatically based on the first individual attempting to complete the transaction.

4. The method of claim 1, wherein determining the manner in which to divide the set of benefits is based on optimizing one or more of:
cash back associated with the transaction,
rewards points associated with the transaction,
a discount applied to the transaction, or
processing fees associated with the transaction.

5. The method of claim 1, further comprising:
providing a set of instructions to the transaction terminal or the transaction backend device to prevent the transaction terminal or the transaction backend device from requesting, from the first individual, input of information associated with the second individual.

6. The method of claim 1, further comprising:
providing another notification to the second individual that the second individual has been selected to facilitate the transaction.

7. The method of claim 1,
wherein the first individual is an untrusted individual to the second individual.

8. A device, comprising:
one or more memories; and
one or more processors, coupled to the one or more memories, configured to:
  receive a request, associated with a first account, to use a second account to complete a transaction,
    wherein the first account is associated with a first individual,
    wherein the second account is associated with a second individual, and
    wherein the second account is associated with a set of benefits to be received based on completing the transaction;
  train a machine learning model based on historical training data that identifies matches between historical account owners and potential account users;
  determine, based on using the trained machine learning model, a match between the first individual and the second individual, wherein the second individual is associated with a potential account and wherein the match between the first individual and the second individual is also a match between the first account and the potential account,
    wherein the one or more processors, to the match between the first account and the potential account, are configured to:
      select the potential account as the second account to use to complete the transaction;
  determine a manner in which to divide the set of benefits between the first account and the second account;
  update the first account and the second account to include corresponding portions of the set of benefits based on determining the manner in which to divide the set of benefits; and
  provide a notification to a transaction terminal or a transaction backend device to cause the transaction terminal or the transaction backend device to request information related to the first individual rather than the second individual when the first individual is using the second account to complete the transaction.

9. The device of claim 8, wherein the request further comprises one or more of:
information that identifies a type of transaction associated with the transaction,
information related to an account of the first individual, or
a set of credentials associated with the first individual.

10. The device of claim 8, wherein the one or more processors, when receiving the request, are configured to:
receive the request automatically based on the first individual attempting to complete the transaction.

11. The device of claim 8, wherein the one or more processors, when determining the manner in which to divide the set of benefits are configured to determine the manner in which to divide the set of benefits based on optimizing one or more of:
cash back associated with the transaction,
reward points associated with the transaction,
a discount applied to the transaction, or
processing fees associated with the transaction.

12. The device of claim 8, wherein the one or more processors are further configured to:
provide a set of instructions to the transaction terminal or the transaction backend device to prevent the transaction terminal or the transaction backend device from requesting, from the first individual, input of information associated with the second individual.

13. The device of claim 8, wherein the one or more processors are further configured to:
provide another notification to the second individual that the second individual has been selected to facilitate the transaction.

14. The device of claim 8, wherein the first individual is an untrusted individual to the second individual.

15. A non-transitory computer-readable medium storing a set of instructions, the set of instructions comprising:
one or more instructions that, when executed by one or more processors of a device, cause the device to:
  receive a request, associated with a first account, to use a second account to complete a transaction,
    wherein the first account is associated with a first individual, wherein the second account is associated with a second individual, and wherein the second account is associated with a set of benefits to be received based on completing the transaction;

train a machine learning model based on historical training data that identifies matches between historical account owners and potential account users;

determine, based on using the trained machine learning model, a match between the first individual and the second individual, wherein the second individual is associated with a potential account and wherein the match between the first individual and the second individual is also a match between the first account and the potential account, wherein the one or more instructions, that cause the device to determine the match between the first account and the potential account, cause the device to:

select the potential account as the second account to use to complete the transaction;

determine a manner in which to divide the set of benefits between the first account and the second account;

update the first account and the second account to include corresponding portions of the set of benefits based on determining the manner in which to divide the set of benefits; and provide a notification to a transaction terminal or a transaction backend device to cause the transaction terminal or the transaction backend device to request information related to the first individual rather than the second individual when the first individual is using the second account to complete the transaction.

16. The non-transitory computer-readable medium of claim 15, wherein the request further comprises one or more of:

information that identifies a type of transaction associated with the transaction, information related to an account of the first individual, or a set of credentials associated with the first individual.

17. The non-transitory computer-readable medium of claim 15, wherein the one or more instructions, that cause the device to receive the request, cause the device to:

receive the request automatically based on the first individual attempting to complete the transaction.

18. The non-transitory computer-readable medium of claim 15, wherein the one or more instructions, that cause the device to determine the manner in which to divide the set of benefits, cause the device to determine the manner in which to divide the set of benefits based on optimizing one or more of:

cash back associated with the transaction, reward points associated with the transaction, a discount applied to the transaction, or processing fees associated with the transaction.

19. The non-transitory computer-readable medium of claim 15, wherein the one or more instructions further cause the device to:

provide a set of instructions to the transaction terminal or the transaction backend device to prevent the transaction terminal or the transaction backend device from requesting, from the first individual, input of information associated with the second individual.

20. The non-transitory computer-readable medium of claim 15, wherein the one or more instructions further cause the device to:

provide another notification to the second individual that the second individual has been selected to facilitate the transaction.

* * * * *